United States Patent
Karam et al.

(10) Patent No.: US 10,630,540 B2
(45) Date of Patent: *Apr. 21, 2020

(54) SELECTABLE DECLARATIVE REQUIREMENT LEVELS

(71) Applicant: Apstra, Inc., Menlo Park, CA (US)

(72) Inventors: Mansour Jad Karam, San Francisco, CA (US); Aleksandar Luka Ratkovic, Palo Alto, CA (US); Andrew Samoylov, San Jose, CA (US)

(73) Assignee: Apstra, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,039

(22) Filed: May 9, 2019

(65) Prior Publication Data

US 2019/0268220 A1 Aug. 29, 2019

Related U.S. Application Data

(63) Continuation of application No. 16/042,624, filed on Jul. 23, 2018, now Pat. No. 10,333,776, which is a continuation of application No. 14/755,153, filed on Jun. 30, 2015, now Pat. No. 10,063,428.

(51) Int. Cl.
*H04L 12/24* (2006.01)
*H04L 12/26* (2006.01)

(52) U.S. Cl.
CPC ........ *H04L 41/0803* (2013.01); *H04L 41/046* (2013.01); *H04L 43/0817* (2013.01)

(58) Field of Classification Search
CPC . H04L 41/0803; H04L 63/0263; H04L 41/12; H04L 49/70; H04L 41/22; H04L 12/46; H04L 12/4641; H04Q 2213/1304
See application file for complete search history.

(56) References Cited

U.S. PATENT DOCUMENTS

| | | | |
|---|---|---|---|
| 8,146,017 B2 * | 3/2012 | Malek | G06Q 10/06 715/835 |
| 8,259,713 B2 | 9/2012 | Lawrence | |
| 8,392,575 B1 | 3/2013 | Marr | |
| 8,490,052 B2 * | 7/2013 | Shukla | G06F 9/45512 717/117 |
| 9,363,208 B1 | 6/2016 | Judge | |
| 9,419,842 B1 | 8/2016 | Galliher, III | |
| 9,621,435 B2 * | 4/2017 | Vasudevan | H04L 41/50 |
| 9,647,882 B1 | 5/2017 | Whittaker | |
| 10,003,527 B1 | 6/2018 | Sorenson, III | |
| 2002/0107953 A1 | 8/2002 | Ontiveros | |
| 2002/0133586 A1 | 9/2002 | Shanklin | |
| 2004/0190502 A1 | 9/2004 | Sharma | |
| 2006/0009213 A1 * | 1/2006 | Sturniolo | H04W 8/02 455/426.1 |

(Continued)

*Primary Examiner* — Sargon N Nano
(74) *Attorney, Agent, or Firm* — Van Pelt, Yi & James LLP

(57) ABSTRACT

Constraints are stored. A plurality of processing stages is processed. For at least one of the plurality of processing stages, an input declarative requirement is utilized with at least some of the constraints to determine an output declarative requirement that is at a lower level than a level of the input declarative requirement. At least a portion of the plurality of processing stages are utilized to at least in part automatically establish and configure a computer network.

24 Claims, 8 Drawing Sheets

(56) References Cited

U.S. PATENT DOCUMENTS

| | | |
|---|---|---|
| 2007/0086429 A1* | 4/2007 | Lawrence ............... H04L 45/04 |
| | | 370/351 |
| 2009/0070549 A1 | 3/2009 | Solomon |
| 2009/0307166 A1 | 12/2009 | Routray |
| 2010/0165876 A1 | 7/2010 | Shukla |
| 2010/0165877 A1 | 7/2010 | Shukla |
| 2010/0169467 A1 | 7/2010 | Shukla |
| 2010/0223095 A1* | 9/2010 | Ranta ................... G06Q 10/109 |
| | | 705/7.31 |
| 2011/0314233 A1 | 12/2011 | Yan |
| 2012/0260237 A1 | 10/2012 | Duddles |
| 2013/0166712 A1 | 6/2013 | Chandramouli |
| 2014/0064269 A1 | 3/2014 | Hamdi |
| 2014/0177470 A1 | 6/2014 | Roitshtein |
| 2014/0214474 A1* | 7/2014 | Balduccini ....... G06Q 10/06315 |
| | | 705/7.25 |
| 2016/0092173 A1 | 3/2016 | Rodrigues |
| 2016/0140259 A1 | 5/2016 | Ponamgi |
| 2016/0330125 A1 | 11/2016 | Mekkattuparamban |
| 2017/0026263 A1 | 1/2017 | Gell |
| 2017/0324664 A1 | 11/2017 | Xu |
| 2017/0331679 A1 | 11/2017 | Whittaker |
| 2017/0346684 A1 | 11/2017 | Ratkovic |

\* cited by examiner

SELECTABLE DECLARATIVE REQUIREMENT LEVELS

CROSS REFERENCE TO OTHER APPLICATIONS

This application is a continuation of U.S. patent application Ser. No. 16/042,624, entitled SELECTABLE DECLARATIVE REQUIREMENT LEVELS filed Jul. 23, 2018 which is incorporated herein by reference for all purposes, which is a continuation of U.S. patent application Ser. No. 14/755,153 entitled SELECTABLE DECLARATIVE REQUIREMENT LEVELS filed Jun. 30, 2015, now U.S. Pat. No. 10,063,428, which is incorporated herein by reference for all purposes.

BACKGROUND OF THE INVENTION

In order to configure a network, a network administrator may specify a declarative requirement of a desired network configuration. For example, the network administrator may specify a declarative requirement of what the final network configuration should be rather than the mechanics of how to accomplish the network configuration. Often these declarative requirements must include very specific types of requirements. However, in many instances, the network administrator may desire flexibility in being able to specify different levels and types of declarative requirements rather than the traditional single type of declarative requirement understood by a traditional system. For example, for certain configurations, the network administrator may want to specify high level declarative requirements while for other configuration instances, the network administrator may want to specify lower and more specific declarative requirements. In other cases, the network administrator may want to mix different types of desired requirements by specifying declarative requirements at a high level along with specific requirements for specific aspects of the declarative requirements. Therefore, there exists a need for a more flexible way to specify declarative requirements.

BRIEF DESCRIPTION OF THE DRAWINGS

Various embodiments of the invention are disclosed in the following detailed description and the accompanying drawings.

DETAILED DESCRIPTION

Figure 1:
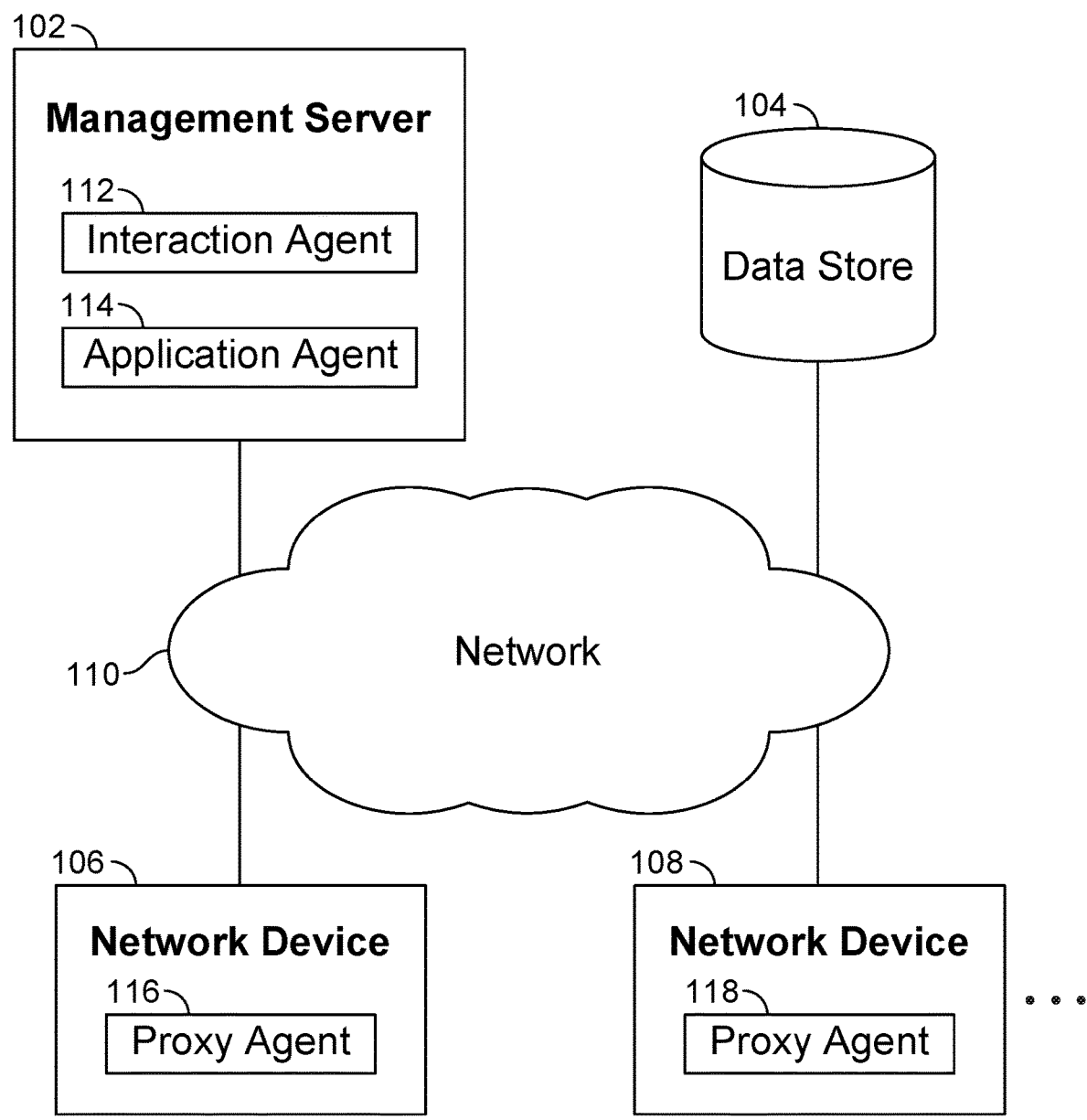
FIG. 1 is a diagram illustrating an embodiment of a network management environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Configuring network devices is disclosed. In some embodiments, constraints are received. For example, information about network resources and/or one or more policies that define how to determine an output from an input requirement are received and/or automatically determined. In some embodiments, there exists a plurality of processing stages in determining device requirements. Each stage corresponds to one or more input declarative requirements that can be specified using an interaction agent. An application agent of each stage merges an input declarative requirement with at least some of the constraints to determine a lower level of output requirement than the level of the input declarative requirement for that level. The lower level output requirement may be utilized as the input declarative requirement for a subsequent lower level processing stage.

In some embodiments, the network may be a collection of one or more devices that are able to be connected together. In some embodiments, at least three components work together to manage, configure, and/or monitor a network. For example, an interaction agent interacts with a user to receive and provide desired requirements, specifications, and status updates; an application agent implements and manages the desired requirements and status updates across various network devices; and a proxy agent of each network component implements and manages device specific configurations and status updates of its network device. In some embodiments, a set of network requirements is received at an interaction agent. For example, desired requirements of a network configuration are received from a user via the interaction agent. At least a portion of the network requirements is published to a system data store. For example, rather than maintaining state information and managing communication between agent components directly at each agent component, the system data store is utilized to track and provide state and communications of agent components.

The published network requirements may be received at an application agent. For example, the application agent has subscribed to the network requirements stored in the system data store and is notified when the set of network requirements is stored in the system data store. Device requirements may be published by the application agent to the system data store for a plurality of devices. For example, the application agent has identified the plurality of devices to be utilized to implement the published network requirements and has generated specific device requirements for each of the plurality of identified devices. The applicable device requirements may be received at a proxy agent of a network device. For example, each proxy agent of each of the identified devices has subscribed to and receives the corresponding device requirements of its network device. Native hardware instructions are generated by the proxy agent to configure an individual network device. For example, the proxy agent translates the received device requirements to generate the hardware instructions to implement the received device requirements.

FIG. 1 is a diagram illustrating an embodiment of a network management environment. Management server 102 is connected to data store 104, network device 106, and network device 108 via network 110. In some embodiments, management server 102 provides a network configuration, monitoring, and management solution. For example, a user may utilize a solution at least in part provided by management server 102 to setup a network configuration, setup a network device, monitor performance of a network, monitor devices of a network, automate tasks, and otherwise perform management of devices of the network. In the example shown, management server 102 is utilized to manage at least network device 106 and network device 108. Management server 102 includes interaction agent 112 and application agent 114. For example, interaction agent 112 and application agent 114 are software components and/or hardware components of management server 102. In some embodiments, management server 102 is specialized custom hardware. In some embodiments, management server 102 is utilized to configure hardware network switches.

Interaction agent 112 facilitates interaction with users to receive and provide desired requirements, specifications, and status updates. For example, a user accesses interaction agent 112 via a user interface (e.g., web interface, application interface, command line interface, application programming interface (API), configuration file interface, etc.) provided directly and/or remotely (e.g., via display, wired connection, network, etc.). Using the user interface, a user may provide high level requirements that specify a desired configuration of a desired network/device and/or receive information regarding status of devices/components of the desired network and/or an implementation status regarding the desired configuration requirements. Interaction agent 112 may manage a plurality of application agents. For example, interaction agent 112 selects an application agent among a plurality of applications to achieve/complete a desired network requirement. In some embodiments, interaction agent 112 is accessed by a user via a RESTful API. For example, HTTP methods (e.g., GET, PUT, POST, DELETE, etc.) are utilized to access and manage information via the API. URI may be utilized to reference state and resources. In some embodiments, a user specifies one or more declarative requirements of a desired network configuration using interaction agent 112. The declarative requirements may be specified at one or more selected stages/levels among a plurality of stages/levels. In some embodiments, a user specifies one or more constraints (e.g., resources, policies, etc.) of a desired network configuration using interaction agent 112.

Application agent 114 implements and manages the desired network requirements, configurations, and status updates across various network devices. In some embodiments, application agent 114 provides device requirement instructions to and receives status information from various devices of a network being managed. For example, using desired network requirements, application agent 114 determines individual device requirements to implement the desired network requirements. The device requirements determined by application agent 114 may be declarative device requirements such that the device requirements may be translated to any of a number of different native device instructions (e.g., native instructions of devices of different vendors, device versions, device operating systems, programming interfaces, etc.) to implement the device requirements. In the example shown, application agent 114 has selected network devices 106 and 108 to implement the desired network requirements and generates unique device requirements for each network device 106 and 108.

In some embodiments, in translating the desired network requirements to the device requirements, a plurality of different successive processing stages/levels may be utilized. The network requirements may be specified for any of the different processing stage levels. For example, network requirements may be specified at the most general and highest level and/or at a lower and more specific stage/level. Each processing stage/level may translate an input declarative requirement to an output declarative requirement that may be utilized as the input declarative requirement for the next subsequent lower processing stage/level. For each processing stage/level, the application agent merges an input declarative requirement with one or more constraints (e.g., resources available, policies to follow, etc.) to determine the output requirement. By being able to provide desired declarative network requirements of any selected stage/level of a plurality of different processing stages/levels, a user is given the option to tune the level/amount of control desired by the user in configuring the network. For example, a network administrator who desires to quickly setup a default configuration network may specify declarative requirements at the highest stage/level while a network administrator who desires to setup a more customized and specific network may specify declarative requirements at a lower stage/level. In some embodiments, each processing stage/level performs a different function. For example, one processing stage/level determines a logical connectivity in its output declarative requirements, another processing stage/level determines physical connectivity in its output declarative requirements, and another processing stage/level determines a cabling in its output declarative requirements.

Proxy agent 116 receives its device requirements for network device 106 and proxy agent 118 receives its device requirements for network device 108. Each proxy agent may generate native hardware instructions implementing its device requirements to configure its associated individual network device. In some embodiments, each proxy agent reports information about a status, an operation, and/or other information of its associated device(s). Application agent 114 may then collect and process the reported information to report the information and/or to perform a responsive action. For example, when a proxy agent provides a status update that its associated device is overloaded, the application agent may add a new device to a network to offload processing and/or to move a processing task of the overloaded device to another network device. The collected status information may be provided by application agent 114 to interaction agent 112 as a report and/or a request for action.

Communication between interaction agent 112, application agent 114, and proxy agents 116 and 118 are facilitated via data store 104. In some embodiments, interaction agent 112, application agent 114, and proxy agents 116 and 118 do not directly communicate with each other. For example, rather than maintaining state information and managing communication between agent components directly at each agent component, the data store 104 is utilized to track and provide state information and communications of agent components. All state information (e.g., state of device, requirements, configurations, etc.) of the agents may be stored in data store 104 rather than storing state information in the agents. When data is to be communicated between the agents, a sending agent publishes/stores the data to be communicated to data store 104. The agent receiving the data may read the data from data store 104 and/or may be pushed the data. For example, an agent subscribes to be notified when a certain type of data is stored in data store 104 and the agent is notified when a new or a modification to the certain type of data is received at data store 104. In some embodiments, an agent periodically polls/checks data store 104 for data. Data store 104 may be included in a networked storage service. In the example shown, the agents access data store 104 via network 110. In some embodiments, data store 104 is directly connected to management server 102 via a non-shared connection. In various embodiments, data store 104 is included in any of the components shown in FIG. 1. For example, data store 104 is included in server 102. Data store 104 may include a server that manages data stored in data store 104 (e.g., manages data subscriptions). Examples of data store 104 include a database, a highly available storage, a distributed storage, a cloud storage, a data service, or any other type of data storage.

Network device 106 and network device 108 may be any type of device connected to network 110. Examples of network device 106 and network device 108 include a server, a network switch, a network router, a cache server, a storage device, a hypervisor switch, virtual router, a load balancer, a firewall, a network fabric device, a virtual network device, a software device, a software component, or any type of computer or networking device that may be physical or virtual. Proxy agent 116 is a software and/or hardware component included in network device 106. Proxy agent 116 manages network device 106. Proxy agent 118 is a software and/or hardware component included in network device 108. Proxy agent 118 manages network device 108. Examples of network 110 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly.

Although single instances of many of the components shown in FIG. 1 have been shown to simplify the diagram, additional instances of any of the components shown in FIG. 1 may exist. For example, any number of management servers, storages, and network devices may exist. Management server 102 may be a cluster of servers and storage 104 may be a distributed storage. Any number of interaction agents, application agents, and/or proxy agents may exist. A single server/device may include any number of interaction agents, application agents, and/or proxy agents. A single interaction agent, application agent, and/or proxy agent may provide a service for a plurality of services/devices. A single interaction agent may interact with a plurality of application agents. For example, different types of network requirements and status updates may be handled by different application agents that all interface with a single interaction agent. Although the example shown in FIG. 1 shows application agent and interaction agent included/installed on the same management server, they may be included in different servers/devices. Although the example shown in FIG. 1 shows each proxy agent included/installed in their respective associated network device, the proxy agents may be included in different servers/devices. For example, the proxy agents are included in management server 102. Although the example shown in FIG. 1 shows that a single proxy agent is only assigned to manage a single associated network device, in some embodiments, a single proxy agent may be assigned to manage a plurality of network devices. Components not shown in FIG. 1 may also exist. In some embodiments, each resource (e.g., each agent, server, and network device) of FIG. 1 may belong to a domain. For example, resources belonging to the same domain are interoperable and may function together to perform a network configuration and/or management task. In some embodiments, each resource may only belong to one domain and only resources within the same domain are guaranteed to be interoperable to perform a network configuration and/or management task. Certain resources may belong to a plurality of domains. A plurality of domains may be utilized to manage a single network. The components shown in FIG. 1 may be components of one or more domains. Any of the components shown in FIG. 1 may be a physical or a virtual component.

Figure 2A:
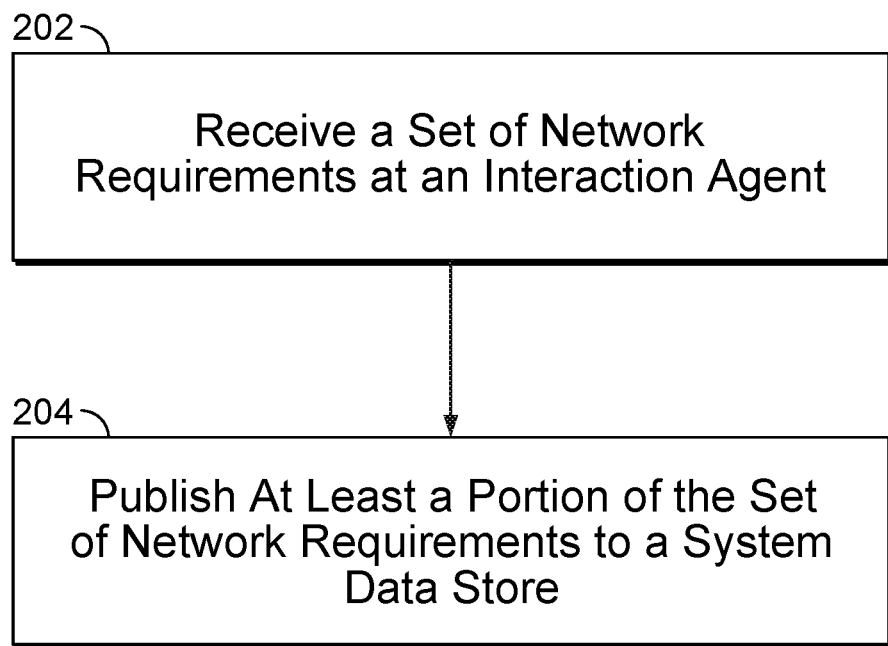
FIG. 2A is a flowchart illustrating an embodiment of a process for publishing network requirements.

FIG. 2A is a flowchart illustrating an embodiment of a process for publishing network requirements. The process of FIG. 2A may be implemented on management server 102 of FIG. 1. In some embodiments, the process of FIG. 2A is performed by interaction agent 112 of FIG. 1.

At 202, a set of network requirements is received at an interaction agent. In some embodiments, the interaction agent is an interaction agent such as interaction agent 112 of FIG. 1. The interaction agent may interface with a user and/or a user system. The interaction agent may be a software and/or hardware component and may be included in a server utilized to manage a network (e.g., manage network devices). In some embodiments, the interaction agent manages one or more application agents. For example, the interaction agent selects one or more application agents that will be implementing the set of network requirements and/or reporting on their status. A user or a user system may access the interaction agent via a user interface (e.g., web interface, visual display interface, application interface, command line interface, application programming interface (API), RESTful API, configuration file interface, etc.) provided directly and/or remotely (e.g., via display, wired connection, network, etc.).

In some embodiments, the set of network requirements includes a specification of a desired configuration, setting, topology, and/or other specifications of a network/service and/or one or more devices connected or able to be connected to the network. In some embodiments, the set of network requirements includes a set of declarative requirements. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient.

In various embodiments, the set of network requirements specifies a desired configuration, a desired action, a command, or any other instruction or desired result of one or more devices. One example of the set of network requirements is a set of requirements to establish a network topology. For example, a mesh network (e.g., Layer 3 Clos Network) is desired to be established and the set of network requirements specifies desired parameters of the desired mesh network. In a Clos Network, every lower-tier switch (e.g., leaves) is connected to each of the top-tier switches (e.g., spines) in a full-mesh topology. A portion of an example set of requirements that specify an instruction to establish an L3 Clos network configuration received via a received requirements file is below:

Network topology type=Clos
\# of spines=16
\# of leaves=128
IP address pool=10.0.0.0/24

The above requirements specify that a Clos network with 16 spine network switches and 128 leaf network switches should be established and the switches of the Clos network should be assigned an IP address from the range 10.0.0.1 through 10.0.0.255.

In some embodiments, the set of requirements is verified for validity and correctness. For example, it is verified that the set of network requirements has been received from an authorized and validated source, the provided requirement specification syntax is correct, valid requirements have been provided, all required parameters for a desired result have been specified, and provided requirements are able to be achieved via available hardware/software resources/devices.

In some embodiments, the set of requirements is a set of declarative requirements that specify a desired configuration, a desired action, a desired mapping result, a command, or any other desired result of one or more declarative requirement processing stages/levels. In some embodiments, the set of requirements may be specified for one or more selected processing stages/levels of successive declarative requirement processing stages/levels. For example, there exists a plurality of processing successive stages/levels that successively require more specific/lower stage/level declarative requirements at each lower stage/level and a user may specify declarative requirements for any one of the stages/levels. In some embodiments, each of the processing stages/levels determines additional aspects of a network to be configured. For example, the output of each processing stage/level includes additional declarative requirements that further define additional aspects of the desired network.

In some embodiments, the set of declarative requirements is specified for a selected processing stage/level. For example, network declarative requirements can be specified for the most general and highest processing stage/level or for a lower and more specific processing stage/level based on the amount of customization and detail desired to be controlled when automatically setting up a network defined by the specified declarative requirements. Each processing stage/level may translate an input requirement to an output requirement that may be utilized as the input requirement for the next processing stage/level, if applicable. For example, by successively converting declarative requirements to a lower stage/level declarative requirement with more specificity at each of the plurality of processing levels/stages, declarative requirements for each specific device to be configured by each proxy agent of each specific device are determined.

In some embodiments, rather than requiring a user to specify declarative requirements that conform to a single specificity level, the user is able to specify declarative requirements at any of a plurality of different specificity levels corresponding to the plurality of processing levels/stages. Thus, by being able to provide desired network declarative requirements at any of a plurality of different selected levels, a user is given the option to specify the level/amount of control desired by the user in configuring the network. For example, a network administrator who desires to quickly setup a default configuration network may specify declarative requirements at the highest stage/level (e.g., number of servers to be supported) while a network administrator who desires to setup a more customized and specific network may specify declarative requirements at a lower stage/level (e.g., specific cable connection mapping between network switches).

In some embodiments, each stage processes an input requirement using one or more constraints (e.g., resources available, policies to follow, etc.) to determine the output requirement. In some embodiments, constraints are received at the interaction agent. For example, a user provides the constraints (e.g., resources available, policies to follow, etc.) for storage in a data store for use in one or more processing stages. In some embodiments, if a required declarative requirement has not been specified by a user, a default declarative requirement that is consistent with the specified declarative requirement is utilized. In some embodiments, declarative requirements may be specified for a plurality of different processing stages/levels. For example, a user may specify a high level declarative requirement for the starting processing stage/level but also for another lower processing stage/level to customize a desired aspect. In some embodiments, the declarative requirements are specified in JavaScript Object Notation (i.e., JSON) format.

At 204, at least a portion of the set of network requirements is published to a system data store. For example, the set of network requirements is published to data store 104 of FIG. 1. In some embodiments, one or more received constraints are published to a system data store. In some embodiments, one or more constraints may be automatically determined. In some embodiments, the interaction agent is stateless. For example, the interaction agent does not maintain its own storage that tracks states of requirement processing and communication. Rather than store and keep track of its state data, the state data is stored/published to a remote network data store (e.g., data store 104 of FIG. 1). By being stateless, the interaction agent may be quickly replaced/restarted when it encounters an error without the need to restore state information in the replaced component.

In some embodiments, publishing the set of network requirements and/or constraints includes storing the set of network requirements and/or constraints in the system data store to allow an application agent to read and access the published set of requirements and/or constraints. Thus, rather than directly communicating the set of network requirements to the application agent, the interaction agent publishes the set of requirements to the storage to communicate the information to the application agent. In some embodiments, publishing the set of requirements includes selecting one or more application agents that are to receive appropriate network requirements. For example, there exists a plurality of different application agents and each application agent performs a different type of processing and/or processing for a different set of one or more network devices. In another example, the same and/or different application agents may perform each processing stage/level of a plurality of different processing stages/levels. In order to achieve/complete the set of network requirements, the set of network requirements may need to be routed to the appropriate application agent for further processing. In some embodiments, the set of network requirements is processed to identify which application agent should receive which portion (or all) of the set of requirements and the requirement(s) to be received by each appropriate application agent is published to a different storage location or identified by a different identifier of the system data store corresponding to the appropriate application agent. For example, the data store includes different data records corresponding to each different application agent and requirement(s) may be communicated to an application agent by publishing requirements to the corresponding data record of the desired application agent. In another example, an identifier included in the published data identifies which application agent should receive the published data. In some embodiments, one or more other network requirements associated with the received set of network requirements are determined and published. For example, a default network requirement for one or more associated processing stages/levels of the received set of network requirements is automatically determined and published for processing.

In some embodiments, the received set of requirements and/or constraints is modified prior to being published. For example, the received set of network requirements is translated into a form that can be published to a data store. In another example, additional requirements determined to be required to achieve the received set of requirements are added. In another example, one or more requirements determined to be not required to achieve the received set of requirements are removed. In another example, one or more requirements of the received set of requirements are modified.

In some embodiments, publishing the set of requirements includes storing/creating an identifier in the system data store that identifies the status of one or more requirements of the set of network requirements. For example, an identifier is stored in the system data store that identifies that the set of network requirements has been published in the system data store and is ready to be processed by one or more application agents. As the set of network requirements is processed by an application agent and other agents, the status identifier may be updated by an application agent or other agents to provide an update of the status of achieving/completing the corresponding requirements.

Figure 2B:
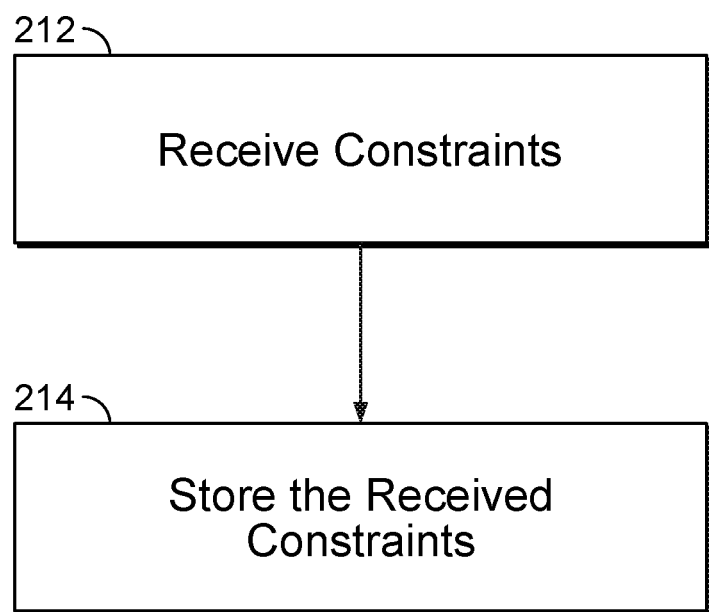
FIG. 2B is a flowchart illustrating an embodiment of a process for processing requirements.

FIG. 2B is a flowchart illustrating an embodiment of a process for processing requirements. The process of FIG. 2B may be implemented on management server 102 of FIG. 1. In some embodiments, the process of FIG. 2B is performed by interaction agent 112 of FIG. 1.

At 212, constraints are received. In some embodiments, one or more constraints are received from a user via an interface. For example, constraints (e.g., resources available, policies to follow, etc.) are received at the interaction agent via a user interface (e.g., web interface, application interface, command line interface, application programming interface (API), RESTful API, configuration file interface, etc.). In some embodiments, the constraints have been automatically determined. For example, the constraints include a list of network switches available and the available resources have been automatically discovered. In some embodiments, the constraints include information identifying resources. For example, identification information about hardware and/or software resources available to be utilized to determine an output declarative requirement is received. In some embodiments, the constraints include specification of one or more policies. For example, a policy specification of how to determine an output requirement is specified by a policy constraint (e.g., how to assign device names, how to assign port mappings, etc.). In some embodiments, the policy constraint may include one or more rules, logic, program code, and/or mappings that at least in part specify how to determine an output from an input declarative requirement. In some embodiments, the constraints may be utilized together with an input declarative requirement by an application agent to determine an output requirement for at least one processing stage/level of a plurality of processing stages/levels of the application agent. In some embodiments, the received constraint is associated with at least one specific processing stage/level.

At 214, the received constraints are stored. In some embodiments, storing the received constraints includes publishing the constraints to a system data store. For example, the constraints are published to data store 104 of FIG. 1. In some embodiments, publishing the constraints includes storing the constraints in the system data store to allow an application agent to read and access the published constraints for use during one or more processing stages/levels. Thus rather than directly communicating the constraints to the application agent, the interaction agent publishes the set of requirements to the storage to communicate the information to the application agent. In some embodiments, publishing the constraints includes selecting one or more application agents that are to receive appropriate constraints. For example, there exists a plurality of different application agents and each application agent performs a different type of processing and/or processing for a different processing stage/level. In another example, the same and/or different application agents may perform each processing stage/level of a plurality of linked processing stages/levels. In some embodiments, publishing the constraints includes selecting one or more processing stages/levels that will be utilizing one or more appropriate constraints. In some embodiments, the received constraints are modified prior to being published. For example, the received constraints are translated into a form that can be published to a data store. In another example, additional constraints determined to be required for processing are added. In another example, one or more constraints determined to be not required are removed.

Figure 3A:
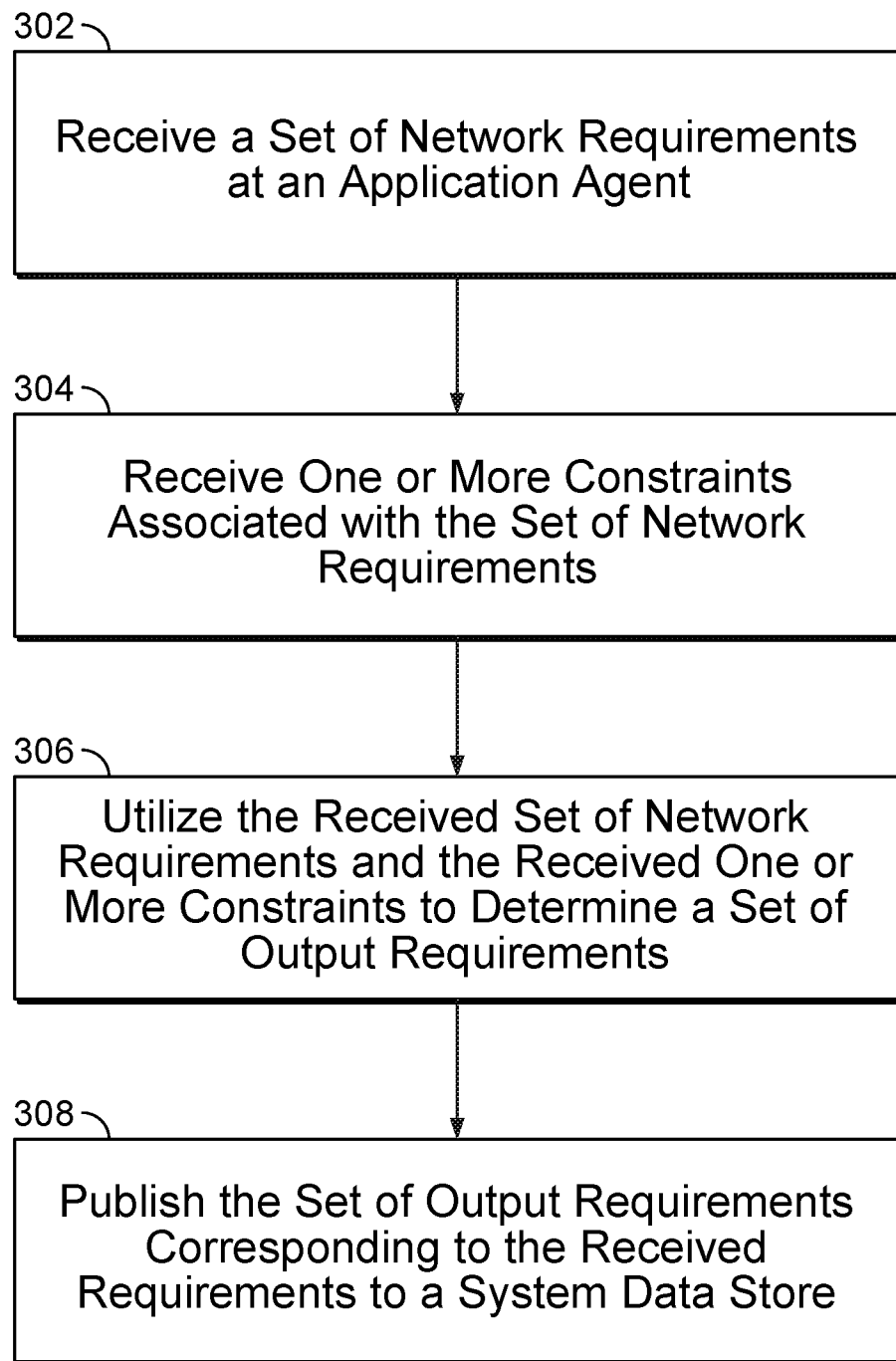
FIG. 3A is a flowchart illustrating an embodiment of a process for publishing device requirements.

FIG. 3A is a flowchart illustrating an embodiment of a process for publishing device requirements. The process of FIG. 3A may be implemented on management server 102 of FIG. 1. In some embodiments, the process of FIG. 3A is performed by application agent 114 of FIG. 1. In some embodiments, the process of FIG. 3A is performed for each set of network requirements to be processed by one or more application agents. In some embodiments, the process of FIG. 3A is performed for each declarative requirement processing stage/level of a plurality of successive processing stages/levels.

At 302, a set of network requirements is received at an application agent. In some embodiments, the application agent is application agent 114 of FIG. 1. In some embodiments, the application agent is a software and/or hardware component that manages desired requirements, configurations, and status updates across various network devices. For example, the application agent provides instructions to and receives status information from various devices of a network being managed. In some embodiments, different types of application agents that perform different functions may exist. For example, network requirements are provided to a specific application agent by matching the requirements to the specific functionality of the specific application agent.

In some embodiments, the received set of requirements is the set of requirements published in 204 of FIG. 2A. In some embodiments, receiving the set of network requirements includes receiving an indication that the set of requirements has been stored in a data store for the application agent. For example, a system data store such as data store 104 of FIG. 1 includes a data record where data for the application agent can be published and/or the system data store recognizes where a published data should be routed based on an included identifier. Each different application agent may subscribe to one or more data records of the system data store and/or subscribe to one or more identifiers that identify content to be routed to the subscribed application agent. In one example, the system data store includes a different data record for each different application agent and the each application agent subscribes to at least its corresponding data record. In another example, each application agent subscribes to an identifier and the system data store routes published data with the identifier to the subscribed application agent.

In some embodiments, by subscribing to a data record, the application agent may be provided a notification by the data storage in the event data is published to a subscribed data record and/or includes a subscribed data identifier. In some embodiments, by subscribing to a data record and/or a data identifier, the application agent may be automatically provided/sent any data published to the subscribed data record and/or identified by the data identifier. In some embodiments, the receiving the set of network requirements includes receiving an indication that the set of network requirements of interest has been stored in the data store and the application agent requests and obtains the set of network requirements of interest. For example, the set of network requirements for a specific processing stage/level to be processed by the application agent is received. In some embodiments, the receiving the set of network requirements includes automatically receiving content of the set of network requirements subscribed by the application agent. In some embodiments, receiving the set of requirements includes directly receiving the set of requirements from an interaction agent.

In some embodiments, the set of requirements is a set of declarative requirements that specifies a desired configuration, a desired action, a desired mapping result, a command, or any other desired result of a declarative requirement processing stage/level. In some embodiments, the set of declarative requirements has been specified for a selected processing stage/level. For example, there exists a plurality of successive processing stages/levels that successively require more specific/lower level declarative requirements at each lower level and a user may specify declarative requirements for any one of the stages/levels. In some embodiments, the set of requirements was not completely specified by a user and the received set of requirements includes a default declarative requirement that is consistent with user specified declarative requirements.

At 304, one or more constraints associated with the set of network requirements are received. For example, constraints (e.g., resources available, policies to follow, etc.) that are to be utilized with the received set of requirements to determine an output are identified and received. In some embodiments, the one or more constraints have been identified based at least in part on a processing stage/level associated with the set of network requirements to be processed by the application agent. In some embodiments, the received set of constraints is the set of constraints stored in 214 of FIG. 2B.

At 306, the received set of network requirements and the received one or more constraints are utilized to determine a set of output requirements. For example, the received set of input requirements and the received one or more applicable constraints are utilized to determine a lower level of output declarative requirements. In some embodiments, the received set of network requirements is a set of declarative requirements that are to be processed using the one or more constraints to ultimately determine a set of declarative device requirements for one or more devices to be configured to implement a desired network. In some embodiments, a linear progression of one or more processing stages/levels is followed to determine a final output set of declarative requirements. In some embodiments, a directed graph progression of one or more processing stages/levels is utilized determine a final output set of declarative requirements. For example, a workflow processing order of a directed acyclic graph of one or more processing stages/levels is followed to determine the final output set of declarative requirements.

In one example, the set of requirements to establish the L3 Clos network configuration described previously is received at the application agent and the application agent analyzes the received requirements and determines and identifies devices that will be utilized to implement the desired network configuration of the received network requirements. The example L3 Clos network requirements specify the number of spine network switch devices to be 16 and the number of leaf network switch devices to be 128. In total, the application agent will determine and identify 144 devices that will need to be configured to implement the desired Clos network. For each of the devices that are to be utilized, the application agent determines the individual device requirements in implementing the desired Clos network. The individual device requirements may be stored in a corresponding system data store entry for each device. For example, the application agent publishes the individual device requirements in 144 different data entries of the data store and each proxy agent of each device accesses these data entries to receive the corresponding device requirements. For the L3 Clos network example, below is one example of device requirements for one of the 144 different device requirements.

Role=spine
IP address=10.0.0.3
Neighbors=[(Leaf-1, 10.0.0.7), (Leaf-2, 10.0.0.15), . . . (Leaf-128, 10.0.0.176)]
Status=defined The above device requirements specify that in a Clos network, one network switch device is to be a spine switch with IP address 10.0.0.3. The leaf switches connected to this spine switch device have been also identified.

In some embodiments, the processing performed in 306 includes performing processing for at least one processing stage/level of a plurality of successive declarative requirement processing stages/levels. For example, a processing for one processing stage/level is performed using the application agent and the output declarative requirement of this process level is published to a data store for use as an input declarative requirement for the next processing stage, if applicable. In another example, the application agent performs processing for a processing stage/level that utilizes the received set of network requirements as an input and also performs processing for subsequent lower level processing stages/levels that each utilize output declarative requirements of a previous higher level processing stage/level as its input declarative requirements until a last processing stage/level determines a set of declarative device requirements for one or more devices to be configured to implement a desired network. If a declarative requirement is not specified for a particular processing stage/level, the required input declarative requirement for the processing stage/level may be determined automatically based on the received declarative requirements (e.g., to be consistent) and/or a default declarative requirement for the processing stage/level is utilized.

In some embodiments, utilizing the one or more constraints includes utilizing information identifying resources to assign a configuration to/from hardware/software resources. For example, devices to be configured are selected from a list of device resources. In another example, a configuration parameter is selected from a list of available configuration parameter ranges. In some embodiments, utilizing the constraint includes utilizing a specification of one or more policies. For example, a policy specification of how to determine the output requirement from the input requirements is specified by a policy (e.g., how to assign device names, how to assign port mappings, etc.). In some embodiments, a policy includes one or more rules, logic, program code, and/or mappings that at least in part specify how to determine the output declarative requirements from the input declarative requirements.

In some embodiments, the application agent utilized to determine the output requirements is configurable/customizable. For example, a user may modify, extend, and/or configure the processing performed by the application agent and/or define the entire application agent. The application agent may be configurable/customizable via an interface such as an API.

In some embodiments, the set of output requirements is verified. In some embodiments, verifying the set of output requirements includes performing one or more tests to determine whether the set of output requirements is valid and matches an intent of input requirement(s). In some embodiments, the test to be performed may depend on the processing stage/level of the set of output requirements, content of the input requirements, content of the output requirements, the application agent utilized, one or more constraints utilized, and/or processing performed to determine the output declarative requirements.

In some embodiments, the final processing stage/level of the plurality of processing stages/levels generates the set of output requirements that includes requirements for one or more devices (e.g., devices determined and selected by device type, capability, quantity required, processing capability, etc. required to implement received requirements) that will be utilized to implement the desired network of the input requirements. For each of the one or more devices that are to be configured, individual device requirements may be determined. In some embodiments, the device requirements for each individual device are declarative requirements. For example, the device requirements include a specification of a desired configuration, setting, and/or other specifications of a network device.

At 308, the set of output requirements corresponding to the received requirements are published to a system data store. In some embodiments, the set of output requirements is to be utilized as input requirements for a next processing level and is published to be provided to an application agent to process the next processing stage/level. In some embodiments, the set of output requirements includes device requirements for one or more devices that are to be configured to implement the received network requirements. For example, the application agent analyzes the received network requirements and determines (e.g., using one or more processing stages/levels) one or more devices (e.g., devices determined and selected by device type, capability, quantity required, processing capability, etc. required to implement received requirements) that will be utilized to implement the received network requirements. For each of the one or more devices that are to be configured, the application agent determines its individual device requirements.

In some embodiments, the device requirements for each individual device are declarative requirements. For example, the device requirements include a specification of a desired configuration, setting, and/or other specifications of a network device. The declarative requirements express a desired configuration of a network device without specifying an exact native device configuration and control flow instructions. By utilizing declarative requirements, what should be accomplished in the network device is specified rather than exact native hardware instructions. By utilizing declarative requirements rather than imperative instructions, the application agent is relieved of the burden of determining the exact device programming and configuration syntax required to achieve a desired result. For example, it is often difficult and burdensome for a user to know the exact imperative syntax and configuration paradigm to configure each device of a network when various different types of devices from different vendors may be utilized and interchanged dynamically on the network.

In some embodiments, publishing the set of output requirements includes storing the output requirements in a system data store (e.g., data store 104 of FIG. 1) to allow one or more application agents and/or proxy agents to read and access the published set of requirements. Thus rather than directly communicating the device requirements to another application agent or one or more selected devices that will be utilized to implement the desired network, the application agent publishes the device requirements to the system storage to communicate the information.

In some embodiments, publishing the set of output requirements includes selecting one or more application/proxy agents that are to receive applicable requirements. For example, there exists a plurality of different proxy agents that are each assigned to a different device of the network. In order to achieve and implement the desired network requirements, the corresponding device requirements may need to be routed to the appropriate proxy agents for further processing. The device requirements to be received by each appropriate application/proxy agent may be published to different storage locations of the system data store corresponding to the appropriate application/proxy agent. For example, the system data store includes different data records corresponding to each different application/proxy agent and appropriate requirements may be communicated to a corresponding proxy agent by publishing the appropriate requirements to the corresponding data record of the desired application/proxy agent.

In some embodiments, requirements for an application agent are published using an identifier that identifies the application agent that is receiving the requirements. In some embodiments, publishing the requirements includes storing/creating an identifier in the system data store. In some embodiments, a status identifier may be updated by the application agent as the requirements are achieved/completed. For example, an identifier is stored in the system data store that identifies that the requirements for an application agent have been published in the system data store and are ready to be processed by an appropriate application agent (e.g., set in "defined" state). As the requirements are processed by the application agent, the status identifier may be updated by the application agent to provide an update of the status of completing the processing stage of the requirements.

In some embodiments, device requirements for each device/proxy agent are published using an identifier that identifies the device/proxy agent that is receiving the corresponding device requirements. In some embodiments, publishing the device requirements includes storing/creating an identifier in the system data store for each device requirement of devices to be utilized to implement the received network requirements. The published "Status" device requirement in the previous L3 Clos network example specifies a status of achieving the device requirement. This status identifier may be updated by a proxy agent of the network switch device as the device requirements are achieved/completed. For example, an identifier is stored in the system data store that identifies that the device requirements for a device have been published in the system data store and are ready to be processed by an appropriate proxy agent (e.g., set in "defined" state). As the device requirements are processed by the proxy agent, the status identifier may be updated by the proxy agent to provide an update of the status of achieving the device requirements.

Figure 3B:
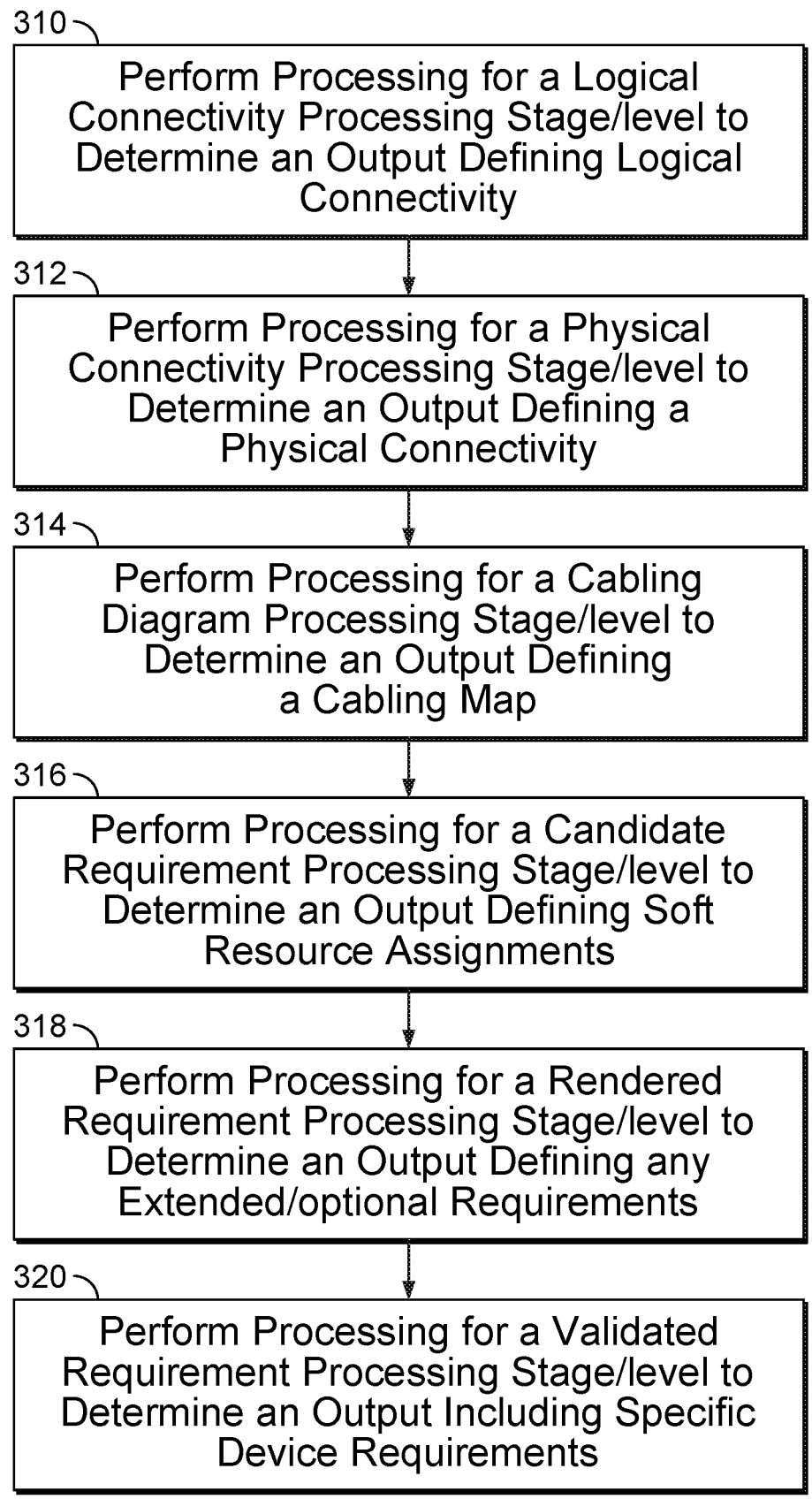
FIG. 3B is a flowchart illustrating an embodiment of an example process for automatically configuring a network using received declarative requirements.

FIG. 3B is a flowchart illustrating an embodiment of an example process for automatically configuring a network using received declarative requirements. The process of FIG. 3B may be implemented on management server 102 of FIG. 1. In some embodiments, the process of FIG. 3B is performed at least in part by one or more different application agents such as application agent 114 of FIG. 1. For example, each processing stage/level may be performed by the same application agent or by different application agents. In some embodiments, at least a portion of the process of FIG. 3B is included in 306 of FIG. 3A. In some embodiments, the process of FIG. 3B is utilized to automatically configure an L3 ClosClos network. For example, the process of FIG. 3B is utilized to configure an L3 ClosClos network for a specific network domain and network point of delivery (i.e., PoD).

In some embodiments, the process of FIG. 3B may be flexibly started/entered at any of the steps of the process depending upon a level of input declarative requirements provided by a user. In some embodiments, after declarative requirements to configure a network are received (e.g., received at 202 of FIG. 2A), the processing stage/level of the declarative requirement processing stages/levels corresponding to the received declarative requirements is determined (e.g., declarative requirements are published in 204 of FIG. 2A for the specific application agent to process the declarative requirement for the identified processing stage/level). For example, the received declarative requirements are analyzed to determine the level/type of requirements specified in the received declarative requirements and the processing stage/level of a plurality of processing stages/levels corresponding to the received declarative requirements is identified. In some embodiments, it is determined which step (e.g., which one of steps 310 to 320) of the process of FIG. 3B corresponds to the identified processing stage/level and the process of FIG. 3B is entered/started at the determined step.

At 310, processing for a logical connectivity processing stage/level is performed to determine an output defining logical connectivity. In some embodiments, the logical connectivity is determined at a processing stage/level of a plurality of declarative requirement processing stages/levels. In some embodiments, processing the logical connectivity processing stage/level includes determining output declarative requirements using input declarative requirements. In some embodiments, the input declarative requirements are at least in part received in 302 of FIG. 3A. In some embodiments, processing the logical connectivity processing stage/level includes determining output declarative requirements identifying logical connections between leaf network switches and spine network switches to implement input declarative requirements defining a desired L3 Clos network. The input declarative requirements of this processing stage/level may specify one or more of the following: the number of servers to be connected using the L3 Clos network to be established; and the oversubscription ratio (e.g., maximum amount of bandwidth theoretically that could be required for a network switch port vs. actual maximum bandwidth capacity of the network switch port). In some embodiments, constraints are obtained (e.g., obtained in 304 of FIG. 3A) and utilized (e.g., utilized in 306 of FIG. 3A) to determine the output declarative requirements. For example, profiles (e.g., number of up ports, number of down ports, etc.) of devices (e.g., network hardware switches) available to be utilized to create the L3 Clos network (e.g., without identifying specific exact machine) are obtained and utilized in selecting the types of devices to be utilized in the output declarative requirement identifying the mesh network. In some embodiments, only devices identified in the constraints may be the switches identified in the output declarative requirements.

In some embodiments, the input declarative requirements of the logical connectivity processing stage/level include one or more declarative requirements provided by a user. For example, the input declarative requirements of the logical connectivity processing stage/level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 310 is not performed in the event a user provided a lower/later level/stage of input declarative requirements. For example, the process of FIG. 3B is entered at 312. In some embodiments, the output declarative requirements are verified to ensure performance expectations and/or an intent of the input declarative requirements are met. In some embodiments, the output declarative requirements are verified to verify the number and/or type of network switches utilized and/or devices utilized in the output declarative requirements.

At 312, processing for a physical connectivity processing stage/level is performed to determine an output defining a physical connectivity. In some embodiments, the physical connectivity processing stage/level is one of a plurality of declarative requirement processing stages/levels. In some embodiments, processing the physical connectivity processing stage/level includes determining output declarative requirements using input declarative requirements. The input declarative requirements of this processing stage/level may be the output declarative requirements of the processing stage/level of 310. In some embodiments, the input declarative requirements are at least in part received in 302 of FIG. 3A. In some embodiments, processing the physical connectivity processing stage/level includes determining an output declarative requirement identifying physical connections between specific device types corresponding to logical connections specified in the input declarative requirements. In some embodiments, constraints are obtained (e.g., obtained in 304 of FIG. 3A) and utilized (e.g., utilized in 306 of FIG. 3A) to determine the output declarative requirements. For example, profiles (e.g., device names, etc.) of specific device types (e.g., specific model/vendor of network hardware switches) available to be utilized to create the L3 Clos network are obtained and utilized in selecting the specific device types and/or device names to be utilized in the output declarative requirement identifying the L3 Clos mesh network. In some embodiments, specific device names and device types are assigned to logical devices of the input declarative requirements to determine the output declarative requirements for this processing stage.

In some embodiments, the input declarative requirements of the physical connectivity processing stage/level include one or more declarative requirements provided by a user. For example, the input declarative requirements of the physical connectivity processing stage/level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 312 is not performed in the event a user provided a lower/later level/stage of input declarative requirements than the level of the physical connectivity processing stage/level. For example, the process of FIG. 3B is entered at 314. In some embodiments, the output declarative requirements are verified to ensure correct route tables are consistent with the input declarative requirements. In some embodiments, the output declarative requirements are verified to verify route tables, specific device types, and/or device names included in the output declarative requirements.

At 314, processing for a cabling diagram processing stage/level is performed to determine an output defining a cabling map. In some embodiments, the cabling diagram processing stage/level is one of a plurality of declarative requirement processing stages/levels. In some embodiments, processing the cabling diagram processing stage/level includes determining output declarative requirements using input declarative requirements. The input declarative requirements of this processing stage/level may be the output declarative requirements of the processing stage/level of 312. In some embodiments, the input declarative requirements are at least in part received in 302 of FIG. 3A. In some embodiments, processing the cabling diagram processing stage/level includes determining an output declarative requirement identifying a cabling map defining connections between ports of L3 Clos switches specified in the input declarative requirements. In some embodiments, constraints are obtained (e.g., obtained in 304 of FIG. 3A) and utilized (e.g., utilized in 306 of FIG. 3A) to determine the output declarative requirements. For example, constraints of port maps/identifications and port resources of specific devices (e.g., network hardware switches) to be utilized to create the L3 Clos network are obtained and utilized in determining the specific cable connections between ports of the switches of the L3 Clos mesh network. In some embodiments, various roles (e.g., server facing, spine, edge, etc.) are assigned for specific ports in determining the output declarative requirements for this processing stage. In some embodiments, one or more policies/rules/code constraints are utilized in determining the cabling diagram output declarative requirement.

In some embodiments, the input declarative requirements of the cabling diagram processing stage/level include one or more declarative requirements provided by a user. For example, the input declarative requirements of the cabling diagram level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 314 is not performed in the event a user provided a lower/later level/stage of input declarative requirements than the level of the physical connectivity processing stage/level. For example, the process of FIG. 3B is entered at 316. In some embodiments, the output declarative requirements are verified to ensure correct cabling and/or port (e.g., port function) mappings.

At 316, processing for a candidate requirement processing stage/level is performed to determine an output defining soft resource assignments. In some embodiments, the candidate requirement processing stage/level is one of a plurality of declarative requirement processing stages/levels. In some embodiments, processing the candidate requirement processing stage/level includes determining output declarative requirements using input declarative requirements. The input declarative requirements of this processing stage/level may be the output declarative requirements of the processing stage/level of 314. In some embodiments, the input declarative requirements are at least in part received in 302 of FIG. 3A. In some embodiments, processing the candidate requirement processing stage/level includes determining an output declarative requirement identifying assigned soft resources of connections identified in the input declarative requirements. In some embodiments, constraints are obtained (e.g., obtained in 304 of FIG. 3A) and utilized (e.g., utilized in 306 of FIG. 3A) to determine the output declarative requirements. For example, constraints including a listing of soft resources (e.g., IP address ranges, autonomous system number (ASN) ranges, etc.) available to be assigned are utilized in assigning soft resources to the network switch connections. In some embodiments, one or more policies/rules/code constraints are utilized in assigning soft resources specified in the output declarative requirements.

In some embodiments, the input declarative requirements of the candidate requirement processing stage/level include one or more declarative requirements provided by a user. For example, the input declarative requirements of the candidate requirement level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirements may be determined to be consistent with at least in part a user provided input declarative requirement. In some embodiments, step 316 is not performed in the event a user provided a lower/later level/stage of input declarative requirements than the level of the physical connectivity processing stage/level. For example, the process of FIG. 3B is entered at 318. In some embodiments, the output declarative requirements are verified to ensure correct IP assignments, ASNs, Border Gateway Protocol (BGP) sessions, etc.

At 318, processing for a rendered requirement processing stage/level is performed to determine an output defining any extended/optional requirements. In some embodiments, the rendered requirement processing stage/level is one of a plurality of declarative requirement processing stages/levels. In some embodiments, processing the rendered requirement processing stage/level includes determining output declarative requirements using input declarative requirements. The input declarative requirements of this processing stage/level may be the output declarative requirements of the processing stage/level of 316. In some embodiments, the input declarative requirements are at least in part received in 302 of FIG. 3A. In some embodiments, processing the rendered requirement processing stage/level includes determining an output declarative requirement identifying final configurations including any extended/optional requirements/configurations of the L3 Clos network to be established. In some embodiments, constraints are obtained (e.g., obtained in 304 of FIG. 3A) and utilized (e.g., utilized in 306 of FIG. 3A) to determine the output declarative requirements. For example, a specification of extended/optional configurations (e.g., configuration to be added/substituted from candidate configurations, parameters, etc.) to be assigned for specific types of devices is utilized in determining extended/optional requirements/configurations of the final requirements specified in the output declarative requirements. In some embodiments, one or more policies/rules/code constraints are utilized in determining the rendered requirement output declarative requirements.

In some embodiments, the input declarative requirements of the rendered requirement processing stage/level include one or more declarative requirements provided by a user. For example, the input declarative requirements of the rendered requirement level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 318 is not performed in the event a user provided a lower/later level/stage of input declarative requirements than the level of the physical connectivity processing stage/level. For example, the process of FIG. 3B is entered at 320. In some embodiments, the output declarative requirements are verified to ensure correct final configurations.

At 320, processing for a validated requirement processing stage/level is performed to determine an output including specific device requirements. In some embodiments, the validated requirement processing stage/level is the final processing stage/level of a plurality of declarative requirement processing stages/levels. In some embodiments, processing the validated requirement processing stage/level includes determining output declarative requirements using input declarative requirements. The input declarative requirements of this processing stage/level may be the output declarative requirements of the processing stage/level of 318. In some embodiments, the input declarative requirements are at least in part received in 302 of FIG. 3A. In some embodiments, processing the validated requirement processing stage/level includes determining an output declarative requirement assigning final configurations to specific network devices to be configured to implement the L3 Clos network. In some embodiments, constraints are obtained (e.g., obtained in 304 of FIG. 3A) and utilized (e.g., utilized in 306 of FIG. 3A) to determine the output declarative requirements. For example, constraints including a specification of specific device profiles, availability of specific actual devices, and/or unique identifiers of (e.g., serial numbers) of specific devices are received to determine specific device/switch assignments to be specified in the output declarative requirements. In some embodiments, one or more policies/rules/code constraints are utilized in assigning specific devices assigned in the validated requirement output declarative requirements.

In some embodiments, the input declarative requirements of the validated requirement processing stage/level include one or more declarative requirements provided by a user. For example, the input declarative requirements of the rendered requirement level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirements may be determined to be consistent with at least in part a user provided input declarative requirement. In some embodiments, step 320 is not performed in the event a user provides final validated requirements identifying specific devices. In some embodiments, the output declarative requirements are verified to ensure correct specific device assignments. In some embodiments, the output declarative requirements are to be pushed to specific proxy agents to configure specific devices/switches. For example, the output declarative requirements of this stage/level are received at 402 of FIG. 4.

Although a simple liner progression of processing stages/levels have been shown in the example of FIG. 3B, in a different example, a directed graph progression of one or more processing stages/levels is utilized determine final output declarative requirements. For example, a workflow processing order of a directed acyclic graph of one or more processing stages/levels is followed to determine the final output set of declarative requirements.

Figure 3C:
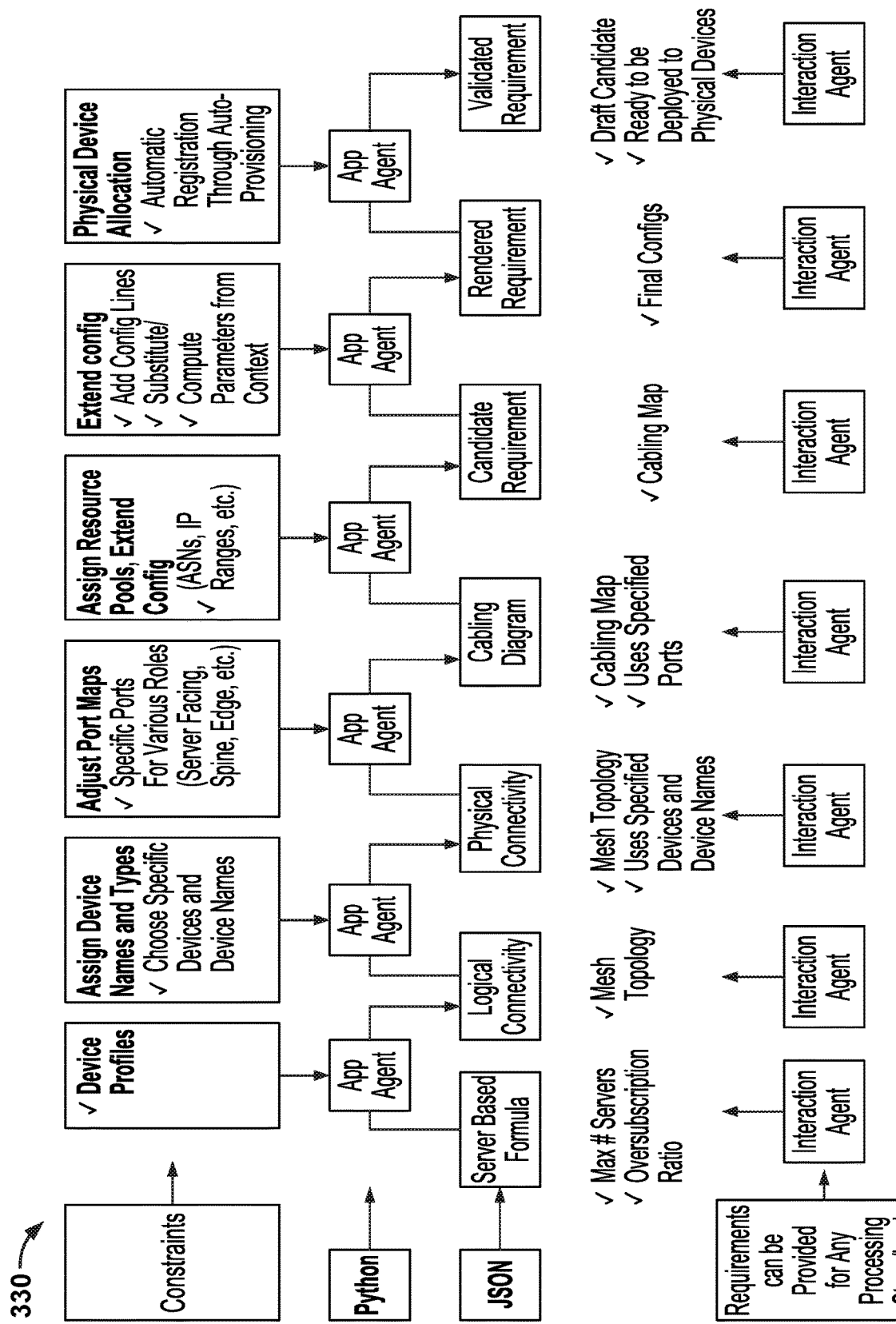
FIG. 3C is a block diagram illustrating processing stages/levels of an example process for automatically configuring an L3 Clos network.

FIG. 3C is a block diagram illustrating processing stages/levels of an example process for automatically configuring an L3 Clos network. The processing shown in FIG. 3C may be implemented on management server 102 of FIG. 1. In some embodiments, the processing shown in FIG. 3C is performed at least in part by one or more different application agents such as application agent 114 of FIG. 1. In some embodiments, the processing shown in FIG. 3C is included in 306 of FIG. 3A. In some embodiments, FIG. 3C illustrates the process of FIG. 3B. In some embodiments, a user is able to flexibly enter the processing shown in FIG. 3C at any one of the successive processing stages/levels depending on a level of input declarative requirements provided by a user.

As shown in diagram 330, output declarative requirements of a previous/higher level stage are utilized by an application agent of the next lower level as its input declarative requirements. The application agents utilize the input declarative requirements along with predefined input constraints to determine the output declarative requirements.

Figure 4:
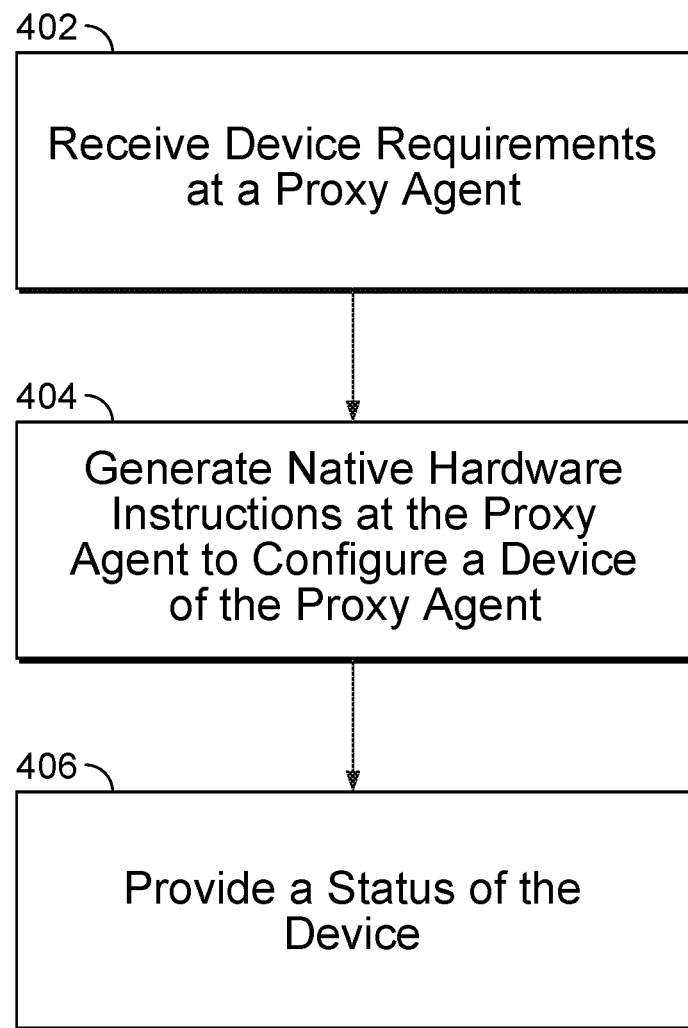
FIG. 4 is a flowchart illustrating an embodiment of a process for generating native hardware instructions.

FIG. 4 is a flowchart illustrating an embodiment of a process for generating native hardware instructions. The process of FIG. 4 may be implemented on network device 106 and/or 108 of FIG. 1. In some embodiments, the process of FIG. 4 is performed by proxy agent 116 and/or 118 of FIG. 1.

At 402, device requirements are received at a proxy agent. In some embodiments, the proxy agent is proxy agent 116 or 118 of FIG. 1. In some embodiments, the proxy agent is a software and/or hardware component that manages and implements device requirements for an associated/assigned device. In some embodiments, different types/versions of proxy agents exist for different network devices. For example, a proxy agent provides conversion functionality between a device requirement and implementing native instructions specific to a device and the proxy agent that can generate native instructions for a specific device (e.g., specific to vendor, operating system, protocol, version, etc. of the device) is selected for the specific device. By separating functionality between the interaction agent, application agent, and proxy agent, only the proxy needs to handle specific native instructions of a device. Thus, when a new type or version of a device is added to a network, only a new proxy agent for the new device is required while the interaction agent and application agent may remain unchanged. This may allow simplified administration of various different types of devices of a network. The proxy agent may be installed on a device managed by the proxy agent. In some embodiments, the proxy agent is remote from the managed device. In some embodiments, one proxy agent may manage a plurality of devices. For example, a single proxy agent may manage a plurality of devices of the same type.

In some embodiments, the received device requirements are the device requirements published in 308 of FIG. 3A for a device of the proxy agent. In some embodiments, receiving the device requirements includes receiving an indication that the device requirements have been stored in a system data store for the proxy agent of a specific device. For example, a system data store such as data store 104 of FIG. 1 includes a data record where data for the proxy agent can be published. Each different proxy agent may subscribe to one or more data records of the system storage that correspond to a device being managed by the respective proxy agent. For example, the system data store includes a different data record for each device of the network and the each proxy agent subscribes to the corresponding data record of its assigned device. In some embodiments, each different proxy agent subscribes with the system data store one or more identifiers that identify the device associated with the corresponding proxy agent. For example, any published data identified by the subscribed identifier is notified to the subscribed proxy agent. In some embodiments, by subscribing to a data record and/or an identifier, the proxy agent may be provided a notification by the data store in the event data is published to the subscribed data record and/or data associated with the identifier has been published. In some embodiments, by subscribing to a data record and/or an identifier, the proxy agent may be automatically provided/sent any data published to the subscribed data record and/or identified by the identifier. In some embodiments, the receiving the device requirements includes receiving an indication that the device requirements have been stored to a data store due to a subscription and the proxy agent requests and obtains the device requirements from the data store. In some embodiments, the receiving the device requirements includes automatically receiving content of device requirements from a data store due to a subscription. In some embodiments, receiving the device requirements includes directly receiving the device requirements from an application agent.

At 404, native hardware instructions are generated at the proxy agent to configure a device of the proxy agent. In some embodiments, the device requirements received by the proxy agent are processed by the proxy agent to generate the native hardware instructions implementing the received device requirements. For example, received declarative instructions are converted to imperative instructions. In some embodiments, the native hardware instructions are in the native programming/configuration syntax of the device. For example, the native hardware instructions are generated in a format native to a configuration software interface of the device. In some embodiments, the native hardware instructions are instructions that can be understood/processed by a software component of the device to configure the device. In some embodiments, the native hardware instructions are in a form that can be directly utilized by the device to configure the device. In some embodiments, the native hardware instructions are executed by the device. For example, the generated native hardware instructions are issued for execution on the device.

In one example, the device requirements to become a spine switch of the L3 Clos network configuration described previously in the specification are received at the proxy agent and the proxy agent analyzes the received device requirements and generates native network switch device instructions to configure the network switch device to become a spine switch of a Clos network with the specified IP address and specified neighbors.

At 406, a status of the device is provided. In some embodiments, step 406 is optional and may not be performed. In some embodiments, providing the status includes publishing an identifier of the status to a system data store (e.g., data store 104 of FIG. 1). In some embodiments, providing the status includes providing an indication of status of achieving the received device requirements. For example, a status indication of a stage of the processing of the device requirements is provided. In some embodiments, providing the status indication includes updating a status identifier in a system data store. For example, a status identifier is updated in data store 104 of FIG. 1 (e.g., allowing the proxy agent to be stateless). In some embodiments, the updated status identifier is the identifier corresponding to the "Status=defined" published in the Clos network device requirement example described previously.

In some embodiments, the status of the device indicates a status of implementing device requirements on the device. For example, the status may be one of six states. The initial first example state is a "defined" state that indicates that the device requirement has been successfully published to a system data store by an application agent. A second example state is a "staged" state that is indicated by a receiving proxy agent that the proxy agent has received the device requirements and has allocated resources to implement the device requirements. A third example state is a "rendered" state that indicates that the proxy agent has generated native hardware instructions corresponding to the device requirements. A fourth example state is a "deployed" state that indicates that the proxy agent has issued the generated native hardware instructions for execution on the device. A fifth example state is an operational state that indicates that the generated native hardware instructions are successfully executed on the device. However, when an error is encountered, a sixth example "error" state may be indicated to indicate that an error has been encountered.

In some embodiments, the status of the device indicates a health state of the device. For example, indication of information such as processing load, CPU utilization, storage utilization, memory utilization, version identification, errors encountered, network status, network bandwidth, network latency, etc. may be provided. In some embodiments, the status of the device indicates a packet drop rate. For example, an indication of a Ternary Content Addressable Memory (i.e., TCAM) utilization of the device is provided by the proxy agent. In another example, an indication is provided when a TCAM table is overflowed.

Figure 5:
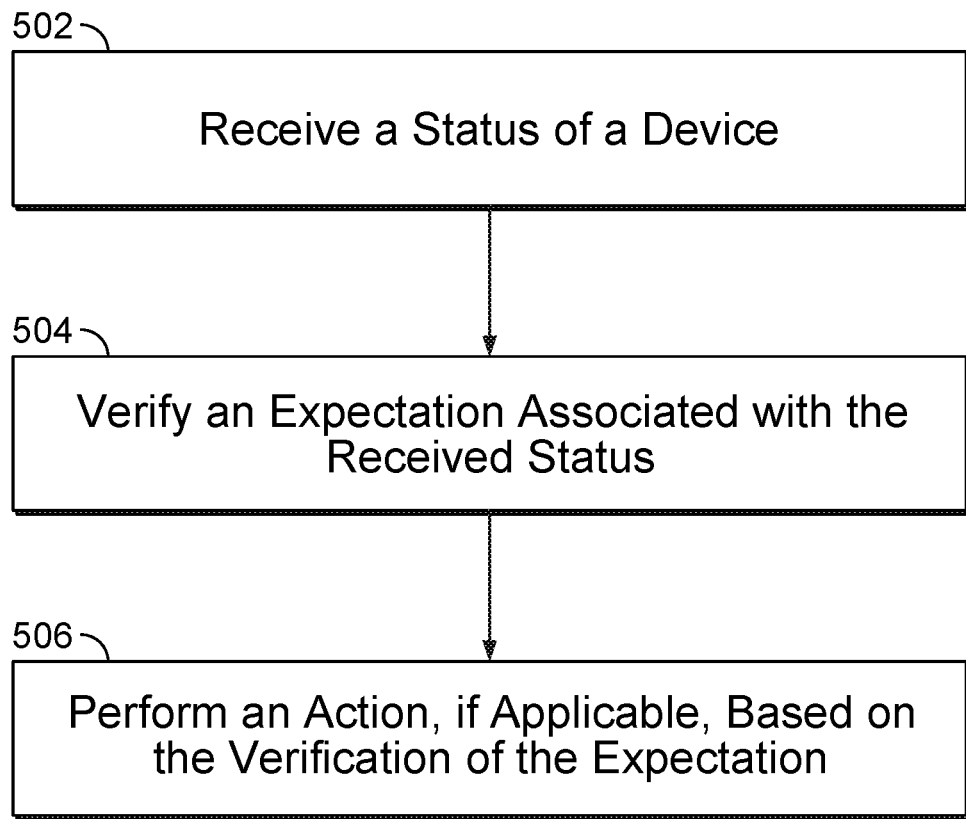
FIG. 5 is a flowchart illustrating an embodiment of a process for verifying an expectation.

FIG. 5 is a flowchart illustrating an embodiment of a process for verifying an expectation. The process of FIG. 5 may be implemented on management server 102 of FIG. 1. In some embodiments, the process of FIG. 5 is performed at least in part by application agent 114 of FIG. 1.

At 502, a status of a device is received. In some embodiments, the status of the device is a status of a resource of the device. In some embodiments, the status of the device is a status of device requirements being implemented by the device. In some embodiments, the status of the device is a status of any errors of the device. In some embodiments, the status of the device is the status provided in 406 of FIG. 4. In some embodiments, the received status is one of a plurality of statuses received from the same proxy agent or different proxy agents of one or more different devices.

In some embodiments, the status is received via a system data store such as data store 104 of FIG. 1. For example, the application agent has subscribed with the data store to receive statuses published in the data store. In some embodiments, rather than subscribing with the data records, the application agent periodically polls/checks the data store. In some embodiments, the status of the device is received by an application agent directly from a proxy agent.

At 504, an expectation associated with the received status is verified. For example, one or more rules or tests are performed to verify that the status is as expected, specified, and/or within a range. In some embodiments, the expectation includes one or more tests to be performed to verify that a set of requirements provided by an interaction agent (e.g., published in 204 of FIG. 2A and received in 302 of FIG. 3A) has been successfully achieved. For example, the received set of network requirements in 202 of FIG. 2A specifies one or more tests to be performed to verify that the set of network requirements has been successfully achieved. For example, in the L3 Clos network example discussed throughout the specification, a test to verify that routing tables have been successfully updated and leaf switch nodes are aware of neighbors to reflect the Clos network configuration is received along with the network requirements received in 202 of FIG. 2A. This test may be published by the interaction agent along with the requirements in 204 of FIG. 2A and the application agent receives the test as the expectation for verification. In some embodiments, the expectation identifies an acceptable range for a resource utilization indicator. In some embodiments, the expectation identifies an error state of the received status.

At 506, an action, if applicable, is performed based on the verification of the expectation. In some embodiments, no action is performed if the received status is as expected, specified, and/or within a range. In some embodiments, the expectation identifies the responsive action to be performed based on the received status. In some embodiments, performing the action includes reporting the received status. For example, a result of a test of the expectation and/or the received status is reported (e.g., report that a test to verify that the set of network requirements has been successfully achieved has passed to indicate that the set of network requirements have been achieved). In some embodiments, reporting the received status includes summarizing a plurality of received statuses. Reporting the status may include providing the report/status to an interaction agent (e.g., the interaction agent may provide the report/status to a user). In some embodiments, reporting the status includes publishing/updating a data record of a system data store such as data store 104 of FIG. 1. For example, a status identifier is published to a data record of the data store that is subscribed by an interaction agent.

In some embodiments, performing the action includes configuring, moving, removing, and/or adding a device of a network and/or a process/program of a device of the network. For example, the application agent generates instructions (e.g., publishes device requirements to a system data store for a proxy agent to implement on a device) to automatically mitigate/fix an error indicated by the status (e.g., repair/replace device that has encountered an error). In one example, when a proxy agent provides a status update that its associated device is overloaded, the application agent may add a new device to a network to offload processing and/or move a processing task of the overloaded device to another network device. The collected status information may be provided by an application agent to an interaction agent as a report and/or a request for action.

In some embodiments, performing the action includes allowing another application agent that is configured to perform the action to perform the action. For example, an application agent that has determined that the received status indicates that the action should be performed informs another application agent (e.g., by publishing to a data store subscribed by the second application agent) to perform the action. In some embodiments, an interaction agent manages which application agent is to perform the action. For example, the interaction agent is informed of the status and instructs (e.g., by publishing requirements to a data store) an application agent that is able to perform responsive action to perform the responsive action. In some embodiments, performing the responsive action includes providing responsive requirements in response to the status that is received in 302 of FIG. 3A. For example, the responsive requirements are translated to device requirements that will be provided to proxy agents to be implemented.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for configuring a computer network, comprising:
   storing constraints; and
   using a processor to process at least a portion of a plurality of processing stages, wherein for at least one of the plurality of processing stages, an input declarative requirement for configuring the computer network to be established is utilized with at least some of the constraints to determine an output declarative requirement for configuring the computer network to be established, the input declarative requirement is to be utilized to configure a computer network switch in establishing the computer network, the output declarative requirement is at a lower level than a level of the input declarative requirement, and the input declarative requirement and the output declarative requirement are different declarative requirements;

wherein the input declarative requirement is allowed to be specified at an appropriate level for any one of two or more of the processing stages; and wherein at least a portion of the plurality of processing stages are utilized to at least in part automatically establish and configure the computer network.

2. The method of claim 1, further comprising selecting a processing stage of the plurality of processing stages corresponding to the level of the input declarative requirement.

3. The method of claim 1, wherein for each of the plurality processing stages, a corresponding input declarative requirement is processed using one or more corresponding constraints to determine a corresponding lower level of output declarative requirement.

4. The method of claim 1, wherein the output declarative requirement is utilized as a next input declarative requirement for another one of the plurality of processing stages.

5. The method of claim 1, wherein the output declarative requirement includes a declarative requirement for a specific network switch device.

6. The method of claim 1, further comprising receiving the constraints.

7. The method of claim 1, further comprising receiving the input declarative requirement from a user.

8. The method of claim 1, wherein the output declarative requirement includes a more specific declarative requirement than the input declarative requirement.

9. The method of claim 1, wherein the constraints include an identifier of a characteristic of a device of the network.

10. The method of claim 1, wherein the constraints include an identifier of a device of the network determined to be available.

11. The method of claim 1, wherein the constraints include a policy.

12. The method of claim 1, wherein the input declarative requirement includes an identification of a number of servers to be connected using the network and an identification of an oversubscription ratio.

13. The method of claim 1, wherein the input declarative requirement includes a cabling mapping.

14. The method of claim 1, wherein utilizing the input declarative requirement with at least some of the constraints includes assigning a resource identified to be available by at least one of the constraints to a connection identified by the input declarative requirement.

15. The method of claim 1, wherein at least a portion of the output declarative requirement is provided to a proxy agent to configure a device of the network.

16. The method of claim 1, wherein the output declarative requirement is validated.

17. The method of claim 1, wherein the output declarative requirement is analyzed to verify that the output declarative requirement matches an intent of the input declarative requirement.

18. The method of claim 1, wherein the plurality of processing stages are processed in a workflow order of a directed acyclic graph.

19. A system for configuring a computer network, comprising:

a memory storing constraints; and a processor coupled with the memory and configured to process at least a portion of a plurality of processing stages, wherein for at least one of the plurality of processing stages, the processor is configured to utilize an input declarative requirement for configuring the computer network to be established with at least some of the constraints to determine an output declarative requirement for configuring the computer network to be established, and the input declarative requirement is to be utilized to configure a computer network switch in establishing the computer network, and the output declarative requirement is at a lower level than a level of the input declarative requirement, and the input declarative requirement and the output declarative requirement are different declarative requirements;

wherein the processor is configured to allow the input declarative requirement to be specified at an appropriate level for any one of two or more of the processing stages; and wherein the processor is configured to utilize at least a portion of the plurality of processing stages to at least in part automatically establish and configure the computer network.

20. A computer program product for configuring a computer network, the computer program product being embodied in a non-transitory computer readable storage medium and comprising computer instructions for:

storing constraints; and processing at least a portion of a plurality of processing stages, wherein for at least one of the plurality of processing stages, an input declarative requirement for configuring the computer network to be established is utilized with at least some of the constraints to determine an output declarative requirement for configuring the computer network to be established, the input declarative requirement is to be utilized to configure a computer network switch in establishing the computer network, the output declarative requirement is at a lower level than a level of the input declarative requirement, and the input declarative requirement and the output declarative requirement are different declarative requirements;

wherein the input declarative requirement is allowed to be specified at an appropriate level for any one of two or more of the processing stages; and wherein at least a portion of the plurality of processing stages are utilized to at least in part automatically establish and configure the computer network.

21. The system of claim 19, wherein the output declarative requirement is a next input declarative requirement for another one of the plurality of processing stages.

22. The system of claim 19, wherein the output declarative requirement includes a declarative requirement for a specific network switch device.

23. The system of claim 19, wherein the input declarative requirement includes an identification of a number of servers to be connected using the network and an identification of an oversubscription ratio.

24. The system of claim 19, wherein the processor is configured to utilize the input declarative requirement with at least some of the constraints including by being configured to assign a resource identified to be available by at least one of the constraints to a connection identified by the input declarative requirement.

* * * * *